(12) United States Patent
Kong et al.

(10) Patent No.: US 9,071,621 B2
(45) Date of Patent: Jun. 30, 2015

(54) SECURITY MANAGEMENT SYSTEM AND METHOD FOR LOCATION-BASED MOBILE DEVICE

(75) Inventors: Hyoung Suk Kong, Seoul (KR); Yong Ho You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 13/479,763

(22) Filed: May 24, 2012

(65) Prior Publication Data

US 2013/0013932 A1  Jan. 10, 2013

(30) Foreign Application Priority Data

Jul. 6, 2011  (KR) .................. 10-2011-0066818

(51) Int. Cl.
*G06F 21/00* (2013.01)
*H04L 29/06* (2006.01)
*G06F 21/62* (2013.01)

(52) U.S. Cl.
CPC ............ *H04L 63/107* (2013.01); *G06F 21/629* (2013.01); *G06F 2221/2111* (2013.01)

(58) Field of Classification Search
CPC ... G06F 21/629; G06F 21/78; G06F 21/6218; G06F 21/32; H04L 63/107
USPC ............ 713/189, 201; 726/4; 455/456.3
See application file for complete search history.

(56) References Cited

U.S. PATENT DOCUMENTS

| | | | |
|---|---|---|---|
| 7,729,995 B1* | 6/2010 | Alain et al. ................ | 705/71 |
| 2005/0055578 A1* | 3/2005 | Wright et al. ............. | 713/201 |
| 2005/0181808 A1* | 8/2005 | Vaudreuil ................. | 455/456.3 |
| 2009/0136081 A1 | 5/2009 | Mamidwar et al. | |

FOREIGN PATENT DOCUMENTS

| | | |
|---|---|---|
| KR | 10-2009-0054942 A | 6/2009 |
| KR | 10-2010-0054685 A | 5/2010 |
| KR | 10-2011-0007834 A | 1/2011 |

* cited by examiner

*Primary Examiner* — Syed Zaidi
(74) *Attorney, Agent, or Firm* — Jefferson IP Law, LLP

(57) ABSTRACT

A method and a system of managing information security for a mobile device in a restricted area based on location information regarding the mobile device are provided. The method includes receiving, by the mobile device, a request for the execution of an application program in a restricted area from a server managing the restricted area, executing, by the mobile device, the application program requested for execution when the program was set to be executable according to a security policy set to the restricted area, encrypting, by the mobile device, a file, created according to the execution of the application program, based on location information regarding the mobile device, and storing the encrypted file.

12 Claims, 7 Drawing Sheets

SECURITY MANAGEMENT SYSTEM AND METHOD FOR LOCATION-BASED MOBILE DEVICE

PRIORITY

This application claims the benefit under 35 U.S.C. §119(a) of a Korean patent application filed on Jul. 6, 2011 in the Korean Intellectual Property Office and assigned Serial No. 10-2011-0066818, the entire disclosure of which is hereby incorporated by reference.

BACKGROUND OF THE INVENTION

1. Field of the Invention

The present invention relates to a security management system and method for a location-based mobile device in a mobile communication system. More particularly, the present invention relates to a system and method that encrypts and stores a file, created in a restricted area, based on location information, and decrypts and executes the stored files based on location information when a request is made to execute the file.

2. Description of the Related Art

Mobile Device Management (MDM) refers to a system that can remotely manage mobile devices via Over The Air (OTA). The original intent of MDM is to integrally manage the distribution of applications, data and configuration settings for mobile devices, and lost mobile devices, and to propose measures for protecting against security threats.

MDM provides a number of functions, including restricting the execution of application programs in a restricted area, such as a camera application program or a recording application program installed in a mobile device. When a mobile device with an MDM client is located in an area under the management of an MDM server, access is blocked to the camera application program or recording application program in the mobile device.

However, this security policy of MDM causes users to have difficulty fulfilling corresponding jobs that require the blocked functions. For example, when users need to record the content of a conference, they cannot use a voice recording function of the mobile device due to the MDM security policy. When users also need to store the images of the content regarding a problem analysis in a particular place, they cannot do the job due to the MDM security policy.

Therefore, a need exists for a system and method for executing application programs or files without violating MDM security policy, thereby providing use convenience.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and method that encrypts and stores a file, created in a restricted area, based on location information, and decrypts and executes the stored files based on location information when a request is made to execute the file.

In accordance with an aspect of the present invention, a method for managing information security for a mobile device in a restricted area, based on location information regarding the mobile device is provided. The method includes receiving, by the mobile device, a request for the execution of an application program in a restricted area from a server managing the restricted area, executing, by the mobile device, the application program requested for execution when the program was set to be executable according to a security policy set to the restricted area, encrypting, by the mobile device, a file, created according to the execution of the application program, based on location information regarding the mobile device, and storing the encrypted file.

In accordance with another aspect of the present invention, a system for providing a location information-based security management is provided. The system includes a Radio Frequency (RF) communication unit for performing RF communication with a server managing a restricted area, a storage unit for storing a security policy set for the restricted area transmitted from the server and a file created according to the execution of an application program, and a controller. The controller receives a request for the execution of the application program in a restricted area from the server, determines whether the application program is set to be executable in the restricted area according to the security policy, executes the application program when the application program is set to be executable according to the security policy, encrypts a file, created according to the execution of the application program, based on location information regarding the mobile device, and stores the encrypted file.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

DETAILED DESCRIPTION OF EXEMPLARY EMBODIMENTS

Figure 1:
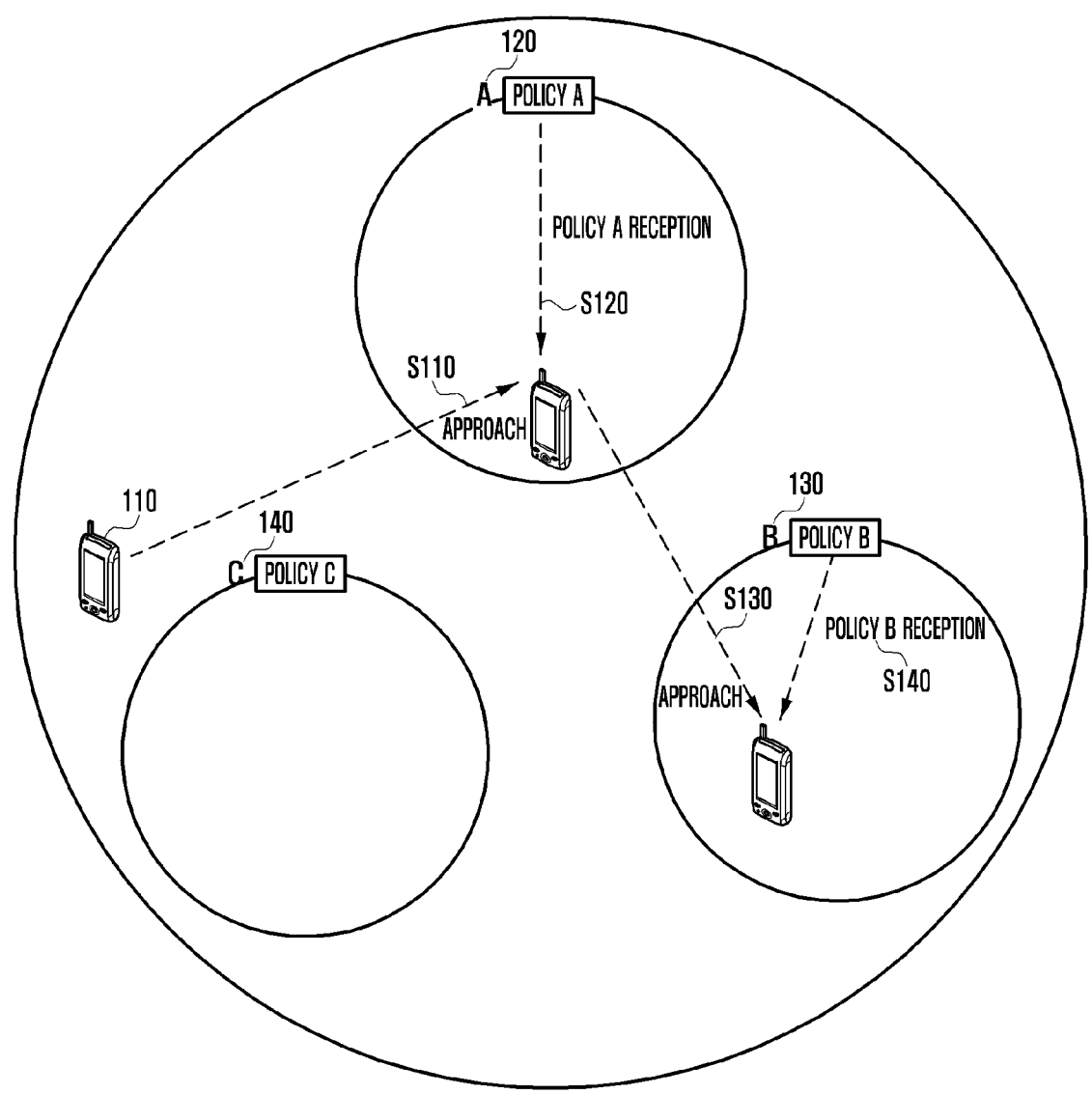
FIG. 1 illustrates a network where files are executed based on location information, according to an exemplary embodiment of the present invention.

In the following description, exemplary embodiments of the file execution method according to the invention are explained based on Mobile Device Management (MDM). However, it should be understood that the invention is not limited thereto. For example, the invention can also be applied to any type of system that can remotely manage mobile devices via wireless transmission technology. That is, the configuration of the invention can also be applied to Device Management (DM) of Open Mobile Alliance (OMA).

The following description with reference to the accompanying drawings is provided to assist in a comprehensive understanding of exemplary embodiments of the as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 illustrates a network where files are executed based on location information, according to an exemplary embodiment of the present invention.

Referring to FIG. 1, the network includes a mobile device 110, and at least one or more servers 120, 130, and 140 that remotely manage the mobile device 110.

The mobile device 110 is equipped with an MDM client. When the mobile device 110 executes the MDM application program and enters a restricted area where is under the management of a server 120 for example, it is subject to the security policy (or policy) set by the server.

In an exemplary embodiment of the present invention, the servers 120, 130 and 140 may be implemented with MDM servers that can remotely manage mobile devices in their controlling areas. Management refers to a process for integrally managing the distribution of applications, data, and configuration settings for mobile devices, and lost mobile devices. Servers have policies respectively. For example, the servers 120, 130, and 140 have policies A, B, and C, respectively.

In an exemplary embodiment of the present invention, policies A to C define applications and the states of whether they can be executed in corresponding restricted areas and are stored in the list in a database. For example, polices A to C may be defined as the following Tables 1 to 3, respectively.

TABLE 1

| Policy A | |
| --- | --- |
| Applications | States whether to be executable |
| Camera operation | Executable |
| Voice recording | Not executable |
| Internet Access | Executable |
| Message transmission | Not executable |
| . . . | . . . |

TABLE 2

| Policy B | |
| --- | --- |
| Applications | States whether to be executable |
| Camera operation | Executable |
| Voice recording | Executable |
| Internet Access | Not executable |
| Message transmission | Not executable |
| . . . | . . . |

TABLE 3

| Policy C | |
| --- | --- |
| Applications | States whether to be executable |
| Camera operation | Not executable |
| Voice recording | Not executable |
| Internet Access | Not executable |
| Message transmission | Not executable |
| . . . | . . . |

When the mobile device 110 executing the MDM application program enters an area under the management of a server, the server transmits the security policy to the mobile device 110, and wirelessly manages the mobile device 110 according to the policy. This process is described with reference to FIG. 1.

When the mobile device 110 enters a restricted area under the management of the server 120 at step S110, the server 120 transmits policy A to the mobile device 110 at step S120. The mobile device 110 is managed, by the server 120, as to whether it can execute an application or a file, according to policy A.

As described in Table 1, since the policy A allows for the execution of a camera application in the restricted area under the server 120, the user can operate the camera of the mobile device 110. The files created according to the execution of the camera application are encrypted and stored in the mobile device 110 according to an encryption key transmitted from the server 120.

When the user requests execution of a stored file from the server 120, the server 120 transmits a decryption key to the mobile device 110. The mobile device 110 decrypts the encrypted data via the decryption key and executes the file.

When the mobile device 110 moves from the area under the management of the server 120 to a restricted area under the management of a server 130 at step S 130, the server 130 transmits policy B to the mobile device 110 at step S140. The mobile device 110 is managed, by the server 130, as to whether it can execute an application or a file, according to policy B.

Figure 2:
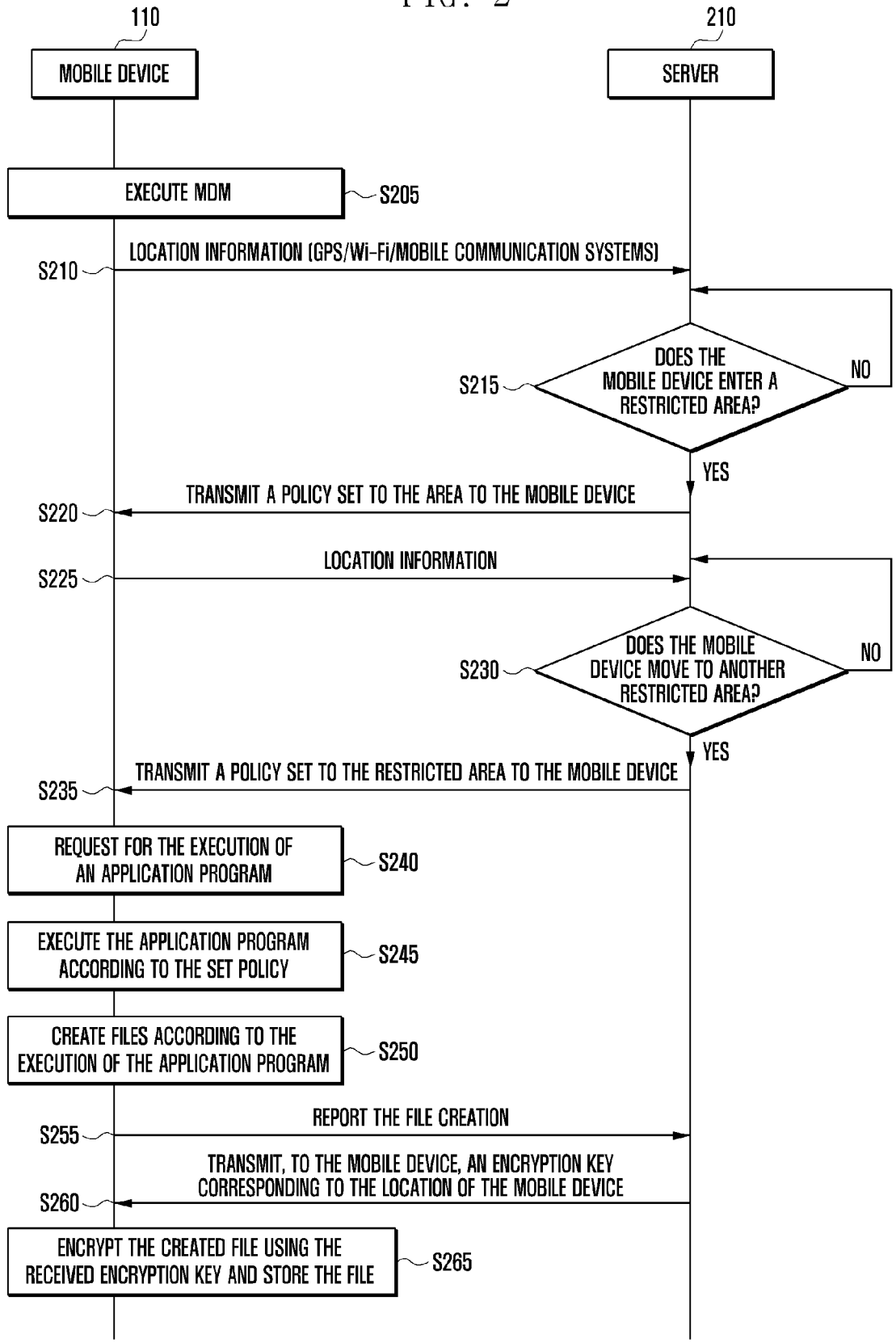
FIG. 2 illustrates a signal flowchart that describes a method for creating a file in a restricted area and storing the file according to an exemplary embodiment of the present invention.
Figure 3:
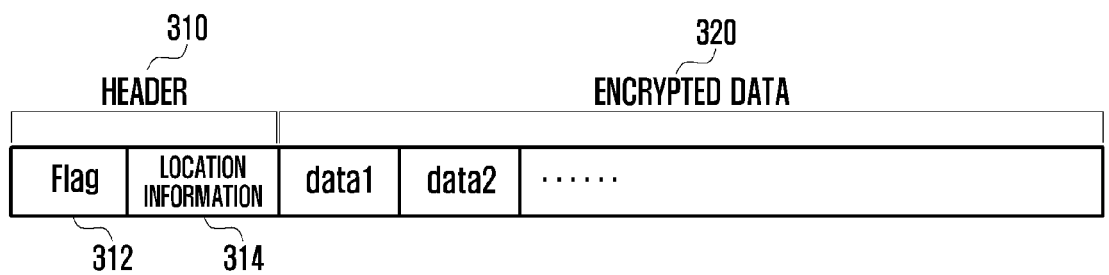
FIG. 3 illustrates a configuration of an encrypted file, according to an exemplary embodiment of the present invention.
Figure 4:
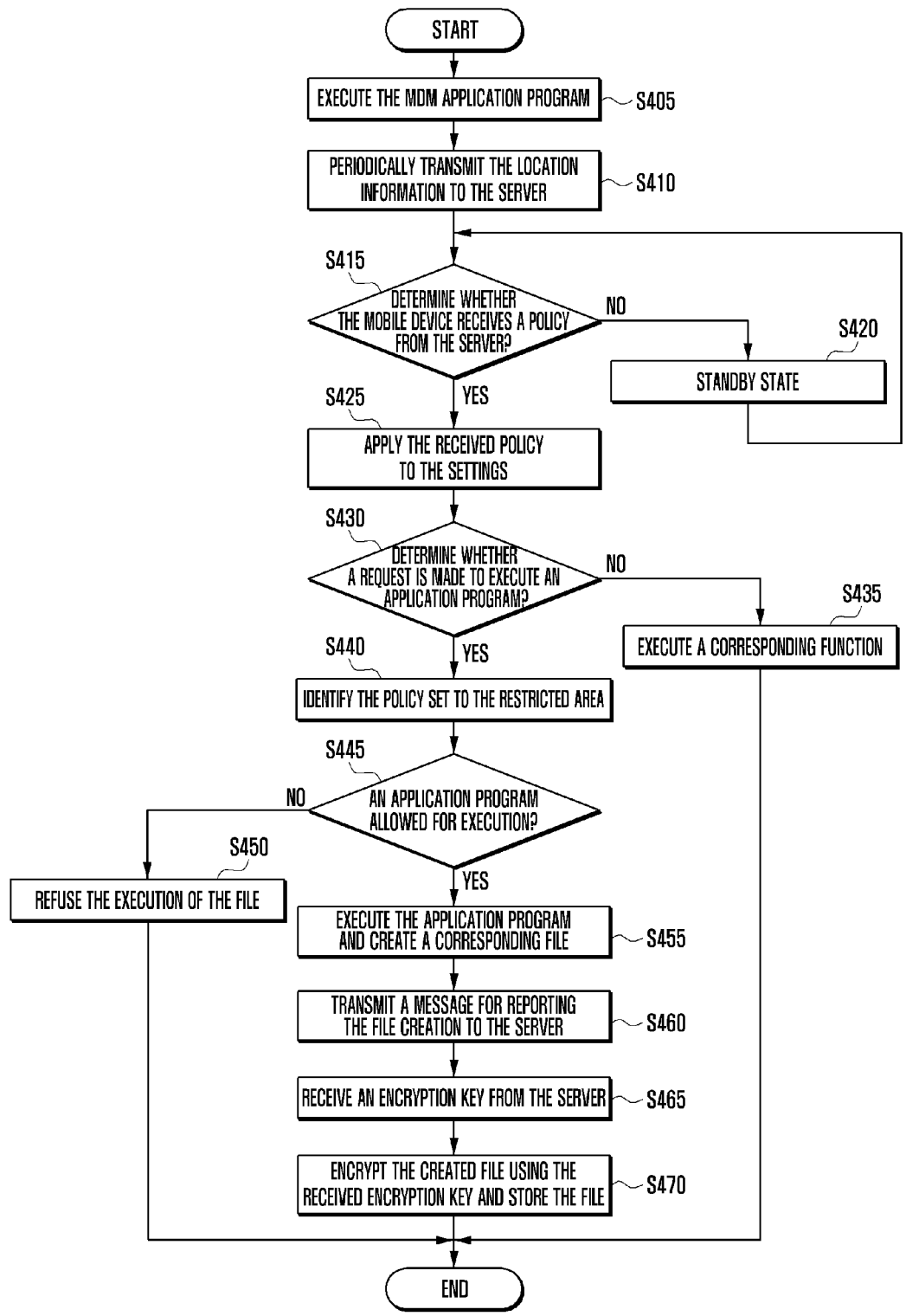
FIG. 4 illustrates a flowchart that describes a method for creating a file in a restricted area and storing the file according to an exemplary embodiment of the present invention.

Referring to FIGS. 2 to 4, a description will be provided regarding a method that creates a file in a restricted area and stores the file, via a mobile device and a server. In addition, referring to FIGS. 5 and 6, a description will also be provided regarding a method that displays and executes a file, created in a restricted area, via a mobile device and a server.

<Creating Files in a Restricted Area and Storing Them>

FIG. 2 illustrates a signal flowchart that describes a method for creating a file in a restricted area and storing the file, according to an exemplary embodiment of the present invention.

Referring to FIG. 2, the mobile device 110 executes the MDM application program at step S205. Executing MDM means that, when the mobile device 110 enters a restricted area under the management of an MDM server, it is managed according to the security policy set in the area.

The mobile device 110 executing the MDM periodically transmits the location information to the server 210 at step S210. In an exemplary embodiment of the present invention, the location information may be acquired via Global Positioning System (GPS), Wi-Fi systems, mobile communication systems (3G-, 4G-communication, etc.). The location information may also include geographic coordinates, such as latitude and longitude, etc.

When the mobile device 110 enters a restricted area under the management of the server 210, the server 210 receives, from the mobile device 110, information regarding the location where the mobile device 110 is located at step S215. The server 210 transmits the policy set to the restricted area to the mobile device 110 at step S220. The mobile device 110 applies the received policy to the setting environment.

When the mobile device 110 moves from the restricted area to another restricted area, it needs to be managed under a policy set to the new restricted area. That is, the mobile device 110 needs to update the policy and to be subject to the policy, while moving between restricted areas.

To this end, the mobile device 110 continues to transmit the location information to the server 210 at step S225. When the mobile device 110 enters a new restricted area under the management of a server, the server detects that the mobile device 110 enters the new restricted area at step S230, and transmits, to the mobile device 110, a policy set to the new restricted area at step S235.

The mobile device 110 in the restricted area may request the execution of application programs at step S240. For example, when the mobile device 110 requests the execution of a camera application program that was set to be executable according to the policy set to the restricted area, it executes the camera application program at step S245.

After that, the mobile device 110 creates files according to the execution of the camera application program, for example, image files or video files, at step S250. Afterwards, the mobile device 110 reports the file creation to the server 210 according to a preset policy at step S255. The server 210 transmits, to the mobile device 110, an encryption key corresponding to the location of the mobile device at step S260.

In an exemplary embodiment of the present invention, the server 210 may store encryption and decryption keys corresponding to location information of the mobile device, as illustrated in Table 4.

TABLE 4

| Locations | Encryption Keys | Decryption Keys |
| --- | --- | --- |
| X | 111000111000 | 000111000111 |
| Y | 101010101010 | 010101010101 |
| Z | 101110111011 | 010001000100 |
| — | | |

As described in Table 4, 'Locations' refer to restricted areas under the management of corresponding servers. For example, location X may refer to a restricted area that server A manages. Therefore, when the mobile device 110 transmits information regarding location X to the server 210, it means that the mobile device 110 enters the restricted area managed by the server X. In an exemplary embodiment of the present invention, it is assumed that all servers store tables with the fields, such as locations, and encryption and decryption keys corresponding to the locations, like Table 4.

Referring back to step S260, the server 210 transmits, to the mobile device 110, an encryption key corresponding to information regarding the location where the mobile device 110 is located. For example, when the server 210 receives information regarding location X from the mobile device 110, it transmits an encryption key '111000111000' to the mobile device 110.

The mobile device 110 encrypts the created file using the received encryption key and stores it at step S265. In an exemplary embodiment of the present invention, an example of the encrypted, stored file by the mobile device 110 is shown in FIG. 3.

Referring to FIG. 3, the encrypted file includes a header 310 and encrypted data 320. The header 310 includes a flag 312 and location information 314. The flag indicates a state as to whether the encrypted file was created in a restricted area. For example, the flag may be set to '1' if the encrypted file was created in a restricted area and '0' if the encrypted file was created outside the restricted area.

When the flag of the encrypted file stored in the mobile device 110 is set to '1,' the location information 314 includes information regarding the location where the encrypted file was created. The location information may be used to identify an encryption key, used in storing the encrypted file, and a decryption key to decrypt the encrypted file.

FIG. 4 illustrates a flowchart that describes a method for creating a file in a restricted area and storing the file according to an exemplary embodiment of the present invention.

Referring to FIG. 4, when the mobile device 110 enters a restricted area, it executes the MDM application program at step S405. The mobile device 110 periodically transmits the location information to the server 210 at step S410, and determines whether it receives a policy from the server 210 at step S415.

When the mobile device 110 ascertains that it does not receive a policy from the server 210 at step S415, it operates in a standby state waiting for a policy from the server 210 at step S420. In contrast, when the mobile device 110 ascertains that it receives a policy from the server 210 at step S415, it applies the received policy to the settings at step S425. In that case, the mobile device 110 is subject to the policy, so that it is restricted to execute corresponding applications or files.

The mobile device 110 determines whether a request is made to execute an application program at step S430. When the mobile device 110 ascertains that a request is not made to execute an application program at step S430, it executes a corresponding function (e.g., calling, etc.) at step S435.

In contrast, when the mobile device 110 ascertains that a request is made to execute an application program at step S430, it identifies the policy that is set to the restricted area where it is located at step S440. After that, the mobile device 110 determines whether the application program requested for execution is included in the list of application programs that are set to be executable according to the identified policy at step S445.

When the mobile device 110 ascertains that the application program requested for execution is not executable at step S445, it refuses the execution of the application program at step S450.

In contrast, when the mobile device 110 ascertains that the application program requested for execution is set to be executable at step S445, it executes the application program and creates a corresponding file at step S455. The mobile device 110 also transmits a message for reporting the file creation to the server 210 at step S460. In an exemplary embodiment of the present invention, the file creation reporting message may include a message for requesting an encryption key from the server 120 that is used when the mobile device 110 stores the file created in the restricted area.

The mobile device 110 receives an encryption key from the server 210 at step S465. The received encryption key is determined according to the location of the mobile device 110 as described in Table 4. The mobile device 110 encrypts the created file using the received encryption key and stores the file at step S470.

<Displaying and Executing Files>

Figure 5:
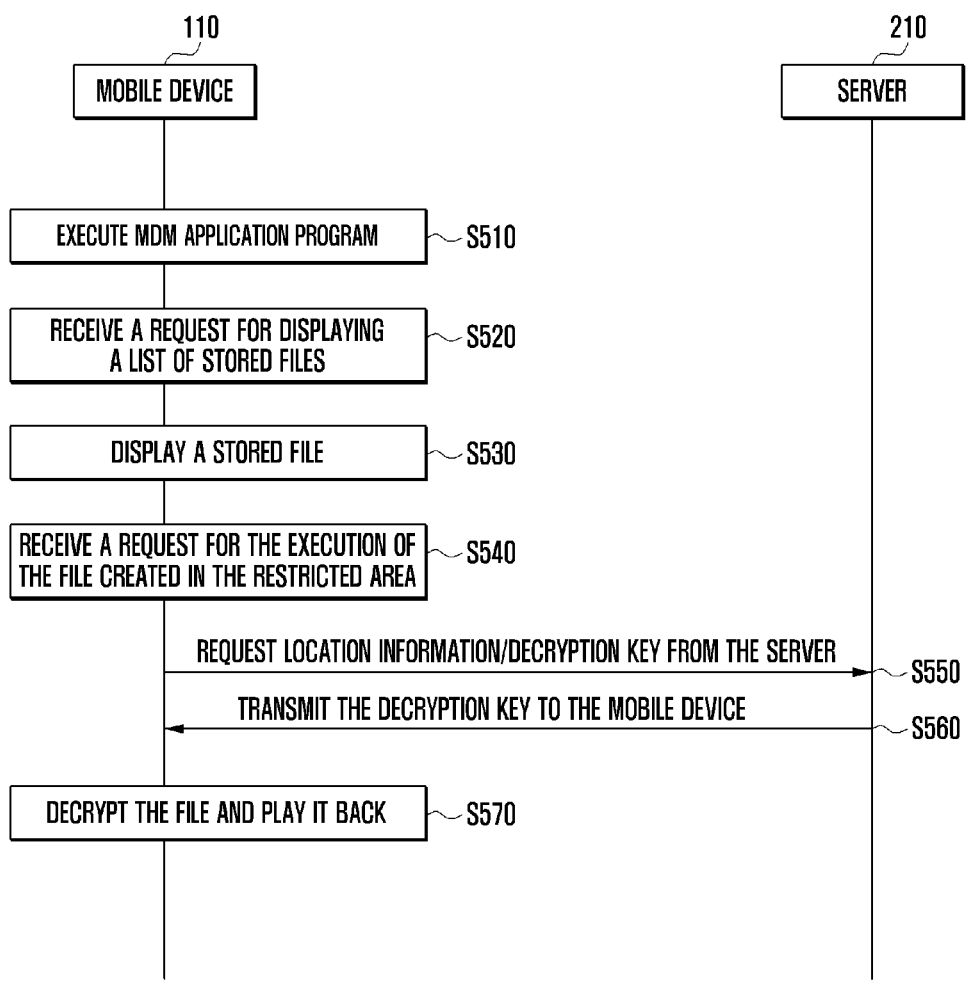
FIG. 5 illustrates a signal flowchart that describes a method for displaying and executing a file, created in a restricted area according to an exemplary embodiment of the present invention.

FIG. 5 illustrates a signal flowchart that describes a method for displaying and executing a file, created in a restricted area, according to an exemplary embodiment of the present invention.

Referring to FIG. 5, the mobile device 110 enters a restricted area and executes the MDM application program at step S510. The mobile device 110 receives a request for displaying a list of stored files (e.g., videos of photographs acquired via the camera) at step S520.

The mobile device 110 displays a stored file at step S530. In another exemplary embodiment of the present invention, the mobile device 110 further determines whether the files to be displayed were stored in the mobile device 110 in the restricted area, which will be described with reference to FIG. 6.

The mobile device 110 receives a request for the execution of the file created when in the restricted area at step S540. The mobile device 110 identifies the flag of the header of the stored file to determine whether the stored file was created while it was in the restricted area. For example, when the flag is set to '1,' the mobile device 110 concludes that the file was created in the restricted area.

When the mobile device 110 receives a request for execution of the file, it requests, from the server 120, information regarding the location where the file was created and a decryption key at step S550. The server 210 identifies an encryption key corresponding to the location information transmitted from the mobile device 110, referring to a table for encryption and decryption keys described in Table 4. The server 210 transmits the decryption key to the mobile device 110 at step S560.

Therefore, the mobile device 110 decrypts the file via the received decryption key, and plays the file back at step S570.

Figure 6:
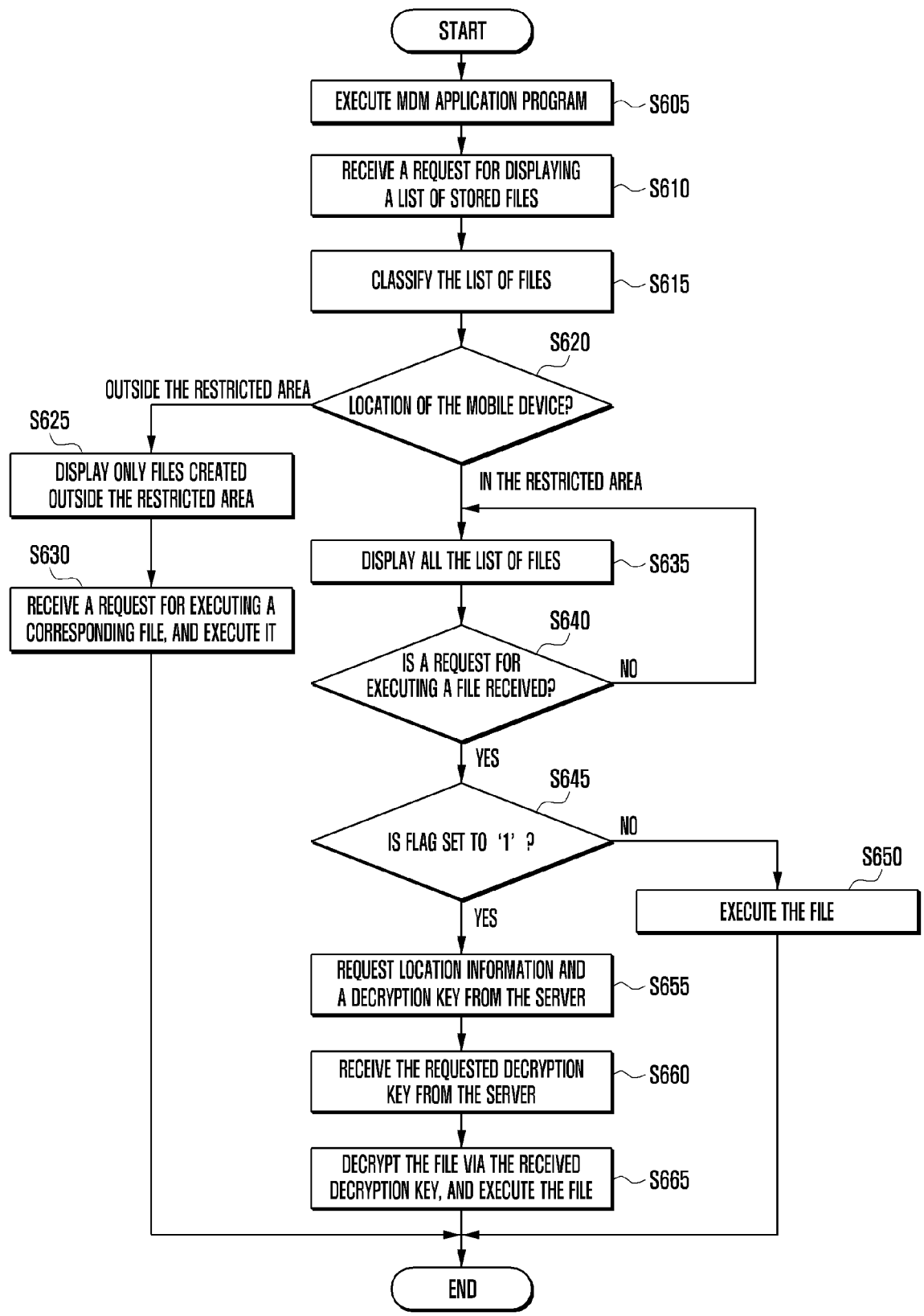
FIG. 6 illustrates a flowchart that describes a method for displaying and executing a file, stored in a storage unit in a restricted area according to an exemplary embodiment of the present invention.

FIG. 6 illustrates a flowchart that describes a method for displaying and executing a file, stored in a storage unit in a restricted area, according to an exemplary embodiment of the present invention.

Referring to FIG. 6, the mobile device 110 executes the MDM application program at step S605, and receives a user's request for displaying a list of stored files at step S610. The mobile device 110 classifies the list of files into files created in the restricted area and files created when it is outside the restricted area at step S615. To do this, the mobile device 110 can identify locations where corresponding files were created, by detecting the flags of the files.

The mobile device 110 determines whether it is located in or outside the restricted area at step S620. Since the mobile device 110 is executing the MDM application program, it can detect whether it is under the management of the server 210 in the restricted area.

When the mobile device 110 ascertains that it is located outside the restricted area at step S620, it displays only files created outside the restricted area, in response to the request for displaying a list of stored files at step S625. That is, the mobile device 110 outside the restricted area does not display files created in the restricted area. After that, the mobile device 110 receives a request for executing a corresponding file, and executes the corresponding file at step S630.

In contrast, when the mobile device 110 ascertains that it is located in the restricted area at step S620, it receives a request for displaying a list of encrypted files, and displays all the stored files at step S635. When the mobile device 110 receives a request for executing a file at step S640, it determines whether the flag of the file is set to '1' at step S645. That is, the mobile device 110 determines whether the file requested for execution was created in the restricted area.

When the mobile device 110 ascertains that the flag of the file is not set to '1,' i.e., the file requested for execution was created outside the restricted area, it executes the file at step S650.

In contrast, when the mobile device 110 ascertains that the flag of the file is set to '1,' i.e., the file requested for execution was created in the restricted area, it requests, from the server 210, information regarding a location where the file requested for execution was created and a decryption key corresponding to the location information at step S655. The mobile device 110 receives the requested decryption key from the server 210 at step S660. The mobile device 110 decrypts the file requested for execution via the received decryption key, and executes the file at step S665.

Figure 7:
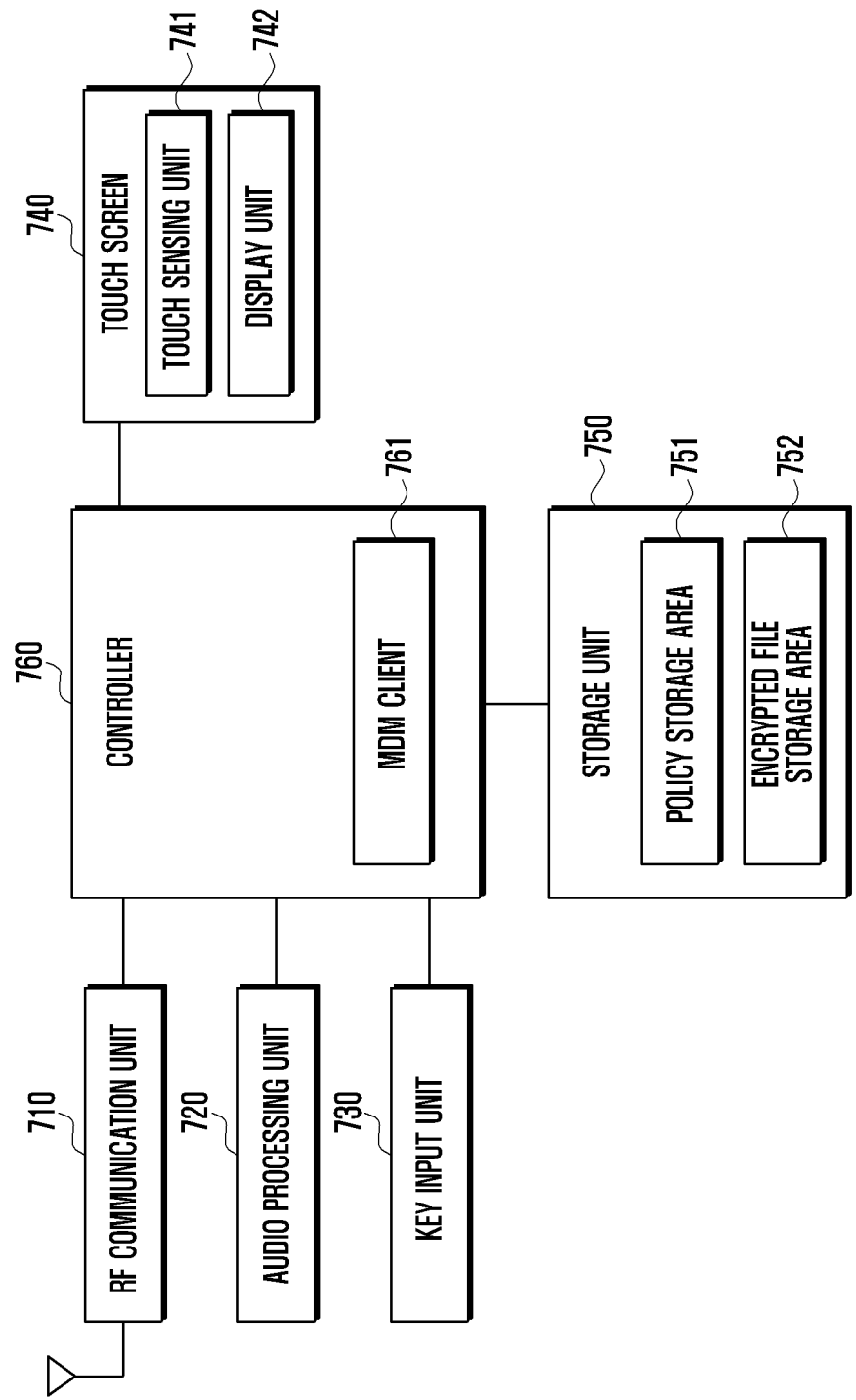
FIG. 7 illustrates a schematic block diagram of a mobile device 110 according to an exemplary embodiment of the present invention.

FIG. 7 illustrates a schematic block diagram of a mobile device 110 according to an exemplary embodiment of the present invention.

Referring to FIG. 7, the mobile device 110 includes a Radio Frequency (RF) communication unit 710, an audio processing unit 720, a key input unit 730, a touch screen 740, a storage unit 750, and a controller 760.

The RF communication unit 710 serves to wirelessly transmit and receive data to and from other communication systems. The RF communication unit 710 includes an RF transmitter for up-converting the frequency of signals to be transmitted and amplifying the signals and an RF receiver for low-noise amplifying received RF signals and down-converting the frequency of the received RF signals. The RF communication unit 710 receives data via an RF channel and outputs the data to the controller 760. The RF communication unit 710 also transmits data, output from the controller 760, via the RF channel. In an exemplary embodiment of the present invention, The RF communication unit 710 receives a security policy, an encryption key, a decryption key, etc. from the server 210, and outputs them to the controller 760.

The audio processing unit 720 includes a Coder and a Decoder (CODEC). The CODEC may include a data CODEC for processing packet data, etc. and an audio CODEC for processing audio signals, such as voice signals, etc. Hence, when a moving picture is taken, the audio CODEC converts digital audio signals into analog audio signals and outputs them via a speaker. The audio CODEC also converts analog audio signals, received via a microphone, into digital audio signals and provides the digital audio data to the controller 760. When a moving picture is reproduced, the audio processing unit 720 converts digital audio data to an analog audio signal through the audio CODEC and outputs the analog signal as audible sound through a speaker (not shown).

The key input unit 730 creates key signals for controlling the mobile device 100 according to a user's key operations, and outputs them to the controller 760. The key input unit 730 is implemented with a keypad with alphanumeric keys and direction keys. The key input unit 730 may be implemented as a function key at one side of the mobile device 110. In an exemplary embodiment of the present invention, when the mobile device 110 is designed to receive a user's operations via only the touch screen 740, it may not be equipped with the key input unit 740.

The touch screen 740 includes a touch sensing unit 741 and a display unit 742. The touch sensing unit 741 senses a user's input touches. The touch sensing unit 741 may be implemented with various types of touch sensors, for example, capacitive overlay type sensors, resistive overlay type sensors, infrared beam type sensors, pressure sensors, etc. It should be understood that the invention is not limited to the sensors listed above. That is, the touch sensing unit 741 can be implemented with all types of sensors that can sense touch, contact, or pressure. The touch sensing unit 741 senses a user's touch applied to the touch screen 740, creates a touch sensed signal, and outputs it to the controller 760. The touch sensed signal includes the coordinate data of a location when the user applies a touch on the touch screen 740. For example, when the user moves the touch on the touch screen 740, the touch screen 740 creates the touch sensed signal including the coordinate data of the touch path sensed via the touch sensing unit 741, and then outputs it to the controller 760.

The display unit 742 displays menus, input data, function-setting information, and additional information regarding the mobile device 110. For example, the display unit 742 displays a booting screen, an idle screen, a menu screen, a call screen, and a variety of screens when application programs are executed. The display unit 742 may be implemented with a Liquid Crystal Display (LCD), an Organic Light Emitting Diode (OLED), an Active Matrix Organic Light Emitting Diodes (AMOLED), or the like. In the case where the display unit 742 is implemented with the LCD, the display unit 742 may include a controller for controlling LCD, a video memory in which image data is stored, and an LCD element. If the LCD is provided as a touch screen 740, the display unit 742 may perform part or all of the functions of an input unit.

Although the exemplary embodiment of the mobile device 110 is implemented with the touch screen 740, it should be understood that the invention is not limited thereto. For example, the touch screen 740 may serve as only a display device, i.e., the display unit 742. In that case, the modification of the mobile device 110 includes the display unit 742 for the displaying function, instead of the touch screen 740.

The storage unit 750 stores programs required to operate the mobile device 110 and data generated when the programs are executed. The storage unit 750 includes a program storage area and a data storage area. The program storage area stores a program for controlling the entire operation of the mobile device 110, an Operating System (OS) for booting the mobile device 110, an application program for reproducing multimedia contents, application programs for optional functions of the mobile device 110, such as a camera function, an audio reproduction function, a image/video reproduction function, etc. The data storage area stores data that is generated when the mobile device 110 is used, for example, images, videos, phone book, audio data, etc.

The storage unit 750 further includes a policy storage area 751 and an encrypted file storage area 752. The policy storage area 751 stores security policies transmitted from the server 210. The policy storage area 751 updates the security policy each time that the mobile device 110 moves from one restricted area to another, including the information regarding the server corresponding to the restricted area where the mobile device 110 is located. The encrypted file storage area 752 stores the encrypted file created in the restricted area. Since the format of the encrypted file stored in the encrypted file storage area 752 is shown in FIG. 3, its detailed description is omitted.

The controller 760 controls the entire operation of the components in the mobile device 110. The controller 760 encrypts a file, created when the mobile device 110 is located in a restricted area, based on the location information, and then stores the file in the storage unit 750. When a request is made to execute the encrypted file, the controller 760 decrypts it based on the location information. To this end, the controller 760 includes an MDM client 761.

When the mobile device 110 executing the MDM application program enters a restricted area under the management of an MDM server, the MDM client 761 controls the mobile device 110 to be subject to the security policy set to the restricted area.

When the mobile device 110 receives a request for executing an application in a restricted area, the MDM client 761 determines whether the application requested for execution is set to be executable in the restricted area according to the security policy. When the MDM client 761 ascertains that the application requested for execution is set to be executable, it executes the application, encrypts the created file based on the location information regarding the mobile device 110, and stores the file. In that case, the encrypted file includes a header and encrypted data. The header includes a flag indicating whether the encrypted file is created when the mobile device 110 is located in a restricted area, and information regarding the location where the encrypted file is created.

The MDM client 761 transmits a message for reporting the creation of a file to the server 210 that manages the restricted area, and receives an encryption key corresponding to the location information regarding the mobile device 110 from the server 210. After that, the MDM client 761 encrypts the created file via the received encryption key, and stores the file.

When a request is made to display the files stored in the mobile device 110, the MDM client 761 determines whether the mobile device 110 is located in a restricted area. When the MDM client 761 ascertains that the mobile device 110 is located in a restricted area, it displays all the files stored in the mobile device 110. In contrast, when the MDM client 761 ascertains that the mobile device 110 is located outside the restricted area, it displays only files created outside the restricted area.

When the mobile device 110 is located in the restricted area and a request is made to execute one of the displayed files, the MDM client 761 determines whether the file requested for execution was created while the mobile device 110 was in the restricted area. When the MDM client 761 ascertains that the file requested for execution was created while the mobile device 110 was in the restricted area, it requests the decryption key from the server managing the restricted area. The MDM client 761 decrypts the file requested for execution using the received decryption key, and executes the file.

Although the exemplary embodiment shows that the controller 760 and the MDM client 761 are configured as separate blocks and have different functions, it should be understood that such configuration is an arrangement for the sake of convenient description and the functions are not definitely distinguished between them. Therefore, it should be understood that the controller may also perform part of the functions of the MDM client 761.

As described above, the exemplary security management system and method can encrypt and store a file, created in a restricted area, based on location information, and can decrypt and execute the stored files based on location information when a request is made to execute the file. Since files created in a restricted area where MDM security policy is effective cannot be executed out of the area, the security management system and method allows the users to freely execute the camera application program or recording-related application program and to view the created files in the area without restriction.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing information security for a mobile device in a restricted area, based on location information regarding the mobile device, the method comprising:
   receiving, by the mobile device, a request for the execution of an application program in a restricted area from a server managing the restricted area;
   executing, by the mobile device, the application program requested for execution when the program is set to be executable according to a security policy set to the restricted area;
   encrypting, by the mobile device, a file, created according to the execution of the application program, based on location information regarding the mobile device, the encrypted file including a flag indicating whether the encrypted file is created while the mobile device is in the restricted area;
   storing the encrypted file;
   receiving, by the mobile device, when the mobile device is located in the restricted area, a request for the execution of the encrypted file;
   requesting, by the mobile device, when the encrypted file requested for execution is created while the mobile device is in the restricted area, a decryption key for executing the encrypted file from the server; and
   receiving, by the mobile device, the decryption key from the server, decrypting the encrypted file via the received decryption key, and executing the decrypted file,
   wherein the encrypted file comprises:
      a header; and
      encrypted data following the header,
   wherein the header comprises:
      the flag; and
      the location information for identifying at least one of an encryption key and the decryption key, and
   wherein the flag indicates whether the location information includes information regarding a location where the encrypted file is created.

2. The method of claim 1, further comprising:
   receiving, by the mobile device, the security policy when the mobile device enters the restricted area.

3. The method of claim 1, wherein the storage of the encrypted file comprises:
   transmitting, by the mobile device, a message for reporting the file creation to a server managing the restricted area;
   receiving, by the mobile device, an encryption key corresponding to the location information regarding the mobile device from the server;
   encrypting, by the mobile device, the created file via the received encryption key; and
   storing the encrypted file.

4. The method of claim 1, wherein the execution of the application program comprises:
refusing the execution of the application program when the application program requested for execution is set not to be executable in the restricted area according to the security policy.

5. The method of claim 1, further comprising:
determining, when a request is made to display files stored in the mobile device, whether the mobile device is located in the restricted area;
displaying, when the mobile device is located in the restricted area, all the files stored in the mobile device; and
displaying, when the mobile device is located outside the restricted area, files that were created while the mobile device was located outside the restricted area.

6. The method of claim 1, wherein the decryption key comprises the location information regarding the mobile device.

7. A location information-based security management system, the system comprising:
a Radio Frequency (RF) communication unit for performing RF communication with a server managing a restricted area;
a storage unit for storing a security policy set for the restricted area transmitted from the server and a file created according to the execution of an application program; and
a controller,
wherein the controller:
receives a request for the execution of the application program in a restricted area from the server, and determines whether the application program is set to be executable in the restricted area according to the security policy;
executes the application program when the application program is set to be executable according to the security policy;
encrypts the file, created according to the execution of the application program, based on location information regarding a mobile device, the encrypted file including a flag indicating whether the encrypted file is created while the mobile device is in the restricted area;
stores the encrypted file;
receives, when the mobile device is located in the restricted area, a request for the execution of the encrypted file;
requests, when the encrypted file requested for execution is created while the mobile device is in the restricted area, a decryption key for executing the encrypted file from the server; and
receives the decryption key from the server, decrypts the encrypted file via the received decryption key, and executes the decrypted file,
wherein the encrypted file comprises:
a header; and
encrypted data following the header,
wherein the header comprises:
the flag; and
the location information for identifying at least one of an encryption key and the decryption key, and
wherein the flag indicates whether the location information includes information regarding a location where the encrypted file is created.

8. The system of claim 7, wherein the controller receives the security policy when the mobile device enters the restricted area.

9. The system of claim 7, wherein the controller:
transmits a message for reporting the file creation to a server managing the restricted area;
receives an encryption key corresponding to the location information regarding the mobile device from the server; encrypts the created file via the received encryption key; and
stores the encrypted file.

10. The system of claim 7, wherein the controller refuses the execution of the application program when the application program requested for execution is set not to be executable in the restricted area according to the security policy.

11. The system of claim 7, wherein the controller:
determines, when a request is made to display files stored in the mobile device, whether the mobile device is located in the restricted area;
displays, when the mobile device is located in the restricted area, all the files stored in the mobile device;
displays, when the mobile device is located outside the restricted area, files that were created while the mobile device was located outside the restricted area.

12. The system of claim 7, wherein the decryption key comprises the location information regarding the mobile device.

* * * * *